subjected to abusive environmental conditions. The tubes 40 and 42 of FIG. 2 or the bars 74 and 76 of FIG. 4, which form elongated reinforcing beams for the steel base and load platform, also contribute to the low profile configuration of the scale. These reinforcing beams form the vertical legs of the parallelogram flexure linkage 38, and since the height of these beams is small compared to the length thereof, a very low profile linkage results. The strength imparted to the scale by the beams of the parallelogram flexure linkage causes the structure to be extremely stable and resistant to abuse. Additionally, the fact that the electronic circuitry for the scale is mounted upon the scale base as a unitary structure and is completely encased in a moisture resistant compound renders the scale resistant to liquids and enables the scale to operate even after being completely immersed in a liquid. Thus, the resultant scale structure will withstand high shock forces and is substantially unaffected by moisture and other liquid environments.

The parallelogram flexure linkage assembly 38 of FIGS. 2–4, although being particularly adaptable for use in a low profile portable electronic scale, is also structurally adpated for incorporation in much larger low profile scales, such as a low profile highway scale as illustrated generally at 82 in FIG. 5. Highway scales employ an extremely long scale platform 84 which is quite subject to torsional stress when a heavy vehicle passes on to the platform and thereby loads one end of the platform. Since the parallelogram flexure linkage previously described lends structural rigidity to a scale platform while causing the scale to accurately indicate a weight applied at any portion of the platform, this linkage may be effectively employed with the large platforms of highway scales. Highway scales generally include a pit 86 below the scale platform for receiving the scale mechanism, and the depth of this pit may be minimized by the parallelogram flexure linkage of the present invention which imparts a very low profile to the highway scale.

The parallelogram flexure linkage employed with the highway scale 82 is identical in construction to the linkages 38 or 72 of FIGS. 2 and 4, with the exception that the highway scale linkage is obviously much larger in size. Although only a single parallelogram linkage might be used for the highway scale, it is preferably to provide at least two such parallelogram flexure linkages 88 and 90 at opposite ends of the scale platform to obtain enhanced structural stability and strength. Tubular beams 92 94, 96, and 98 of the flexure linkages extend completely across the width of the scale platform 84 with the outermost beams 92 and 98 being secured to the base 100 of the scale. The base of the scale may constitute the concrete bottom of the pit 86, and the tubular beams 92 and 98 may be secured thereto in any suitable manner so that these beams are maintained in parallel, horizontal coplanar relationship. For example, mounting plates 102 secured to the scale base 100 may be provided at each end of the tubular beams 92 and 98 so that the ends of the tubular beams may in turn be secured to the mounting plates by welding or other suitable means. Similarly, the innermost tubular beams 94 and 96 are secured at either end to the frame 104 of the scale platform 84.

The tubular beams of each of the parallelogram flexure linkages 88 and 90 are connected together by flexure plates 106, and each of these parallelogram flexure linkages is identical in construction to that disclosed and described in connection with FIG. 2. It must also be recognized that each of the parallelogram flexure linkages 88 and 90 might incorporate the linkage structure disclosed and described in connection with FIG. 4.

Although a single load cell might be provided for both of the parallelogram flexure linkages 88 and 90, it is anticipated that these linkages might suitably be connected to separate load cells 108 and 114. This may be accomplished by links indicated diagrammatically at 110 and 112 which are secured to the innermost tubular beams 94 and 96 of the parallelogram flexure linkages 88 and 90. The inner ends of these links will be suitably connected to operate the load cells 108 and 114 mounted upon the base 100 of the scale or upon the side walls of the pit 86.

Even when separate load cells are used for each of the parallelogram flexure linkages 88 and 90, the platform 84 must be constructed to provide for expansion and contraction. This can be accomplished in many known ways, such as providing the platform frame with sliding plates to permit expansion and constriction.

In an unloaded condition of the scale, the beams 92, 94, 96, and 98 of the parallelogram flexure linkages are maintained in substantially parallel, horizontal coplanar relationship. The application of a load to the platform 84 causes these linkages to apply a corresponding force to a load cell which then generates in known manner an electrical signal or hydraulic, pneumatic or mechanical outputs indicative of this force. Obviously the scale structure 82 may incorporate overload checks of the type similar to that disclosed in FIG. 2, or other overload structures of conventional type.

IT will be readily apparent to one skilled in the art that the present invention provides an extremely durable low profile scale structure particularly adapted for use in environments previously not suited for electronic scales.

I claim:

1. A low profile weighing assembly comprising scale platform means for receiving a load, support means spaced beneath said scale platform means, and parallelogram flexure linkage means operating to connect said scale platform means to said support means and to apply vertical forces induced by a load on said scale platform means to load sensing means, said parallelogram flexure linkage means including first and second spaced linkages positioned beneath said scale platform means, each such linkage including first and second elongated beams arranged in spaced substantially parallel co-planar relationship and extending substantially parallel to said scale platform means, said first elongated beam being connected to said support means and said second elongated beam being connected to said scale platform means and flexure plate means secured to and extending between said first and second elongated beams in substantially parallel relationship to said scale platform means and operating to offer low resistance to forces applied vertically to said scale platform means, said flexure plate means including vertically spaced upper and lower flexure plates extending in substantially parallel relationship between said first and second elongated beams.

2. The low profile weighing assembly of claim 1 wherein the ends of said first elongated beams are secured to said support means and the ends of said second elongated beams are secured to said scale platform

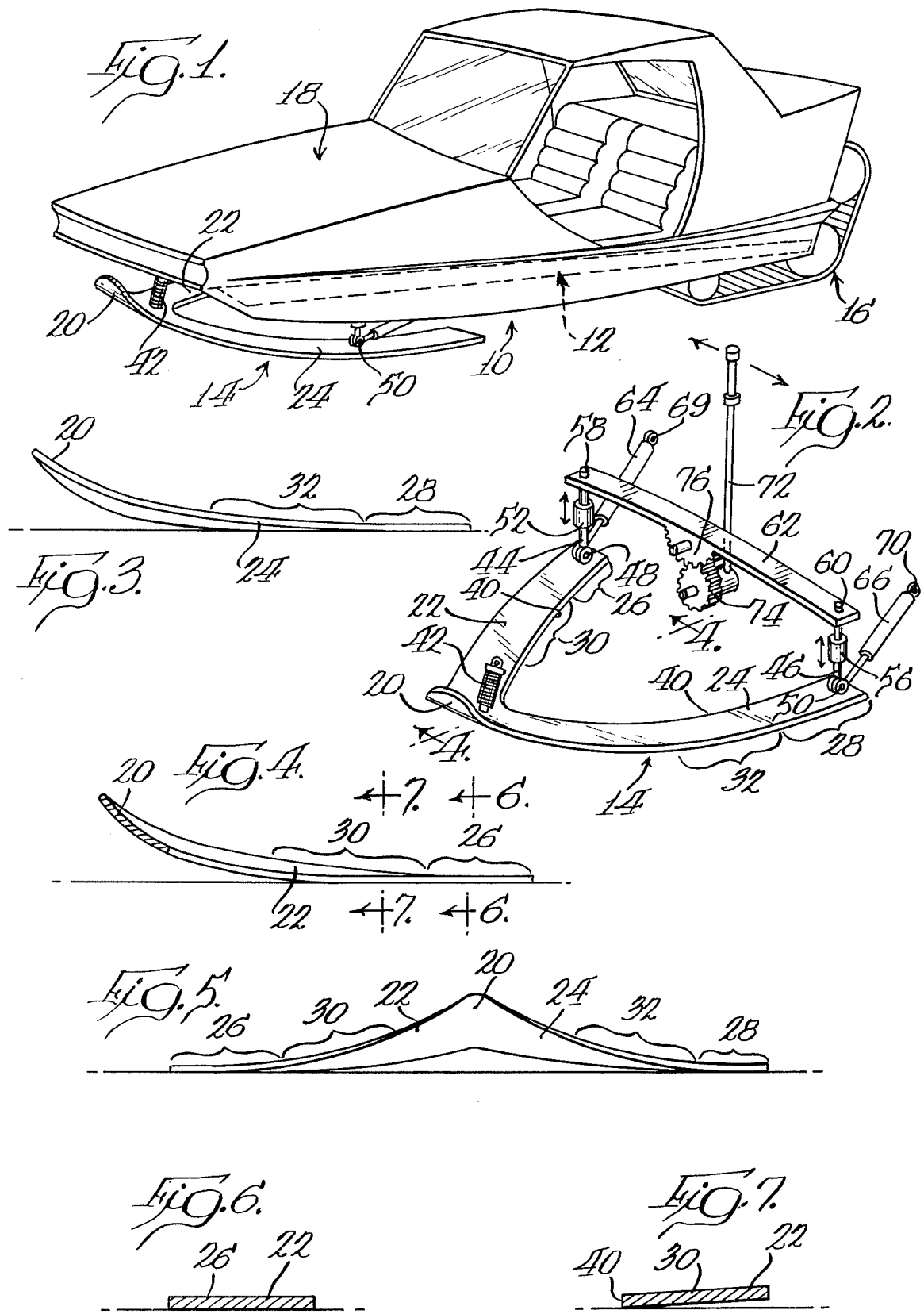

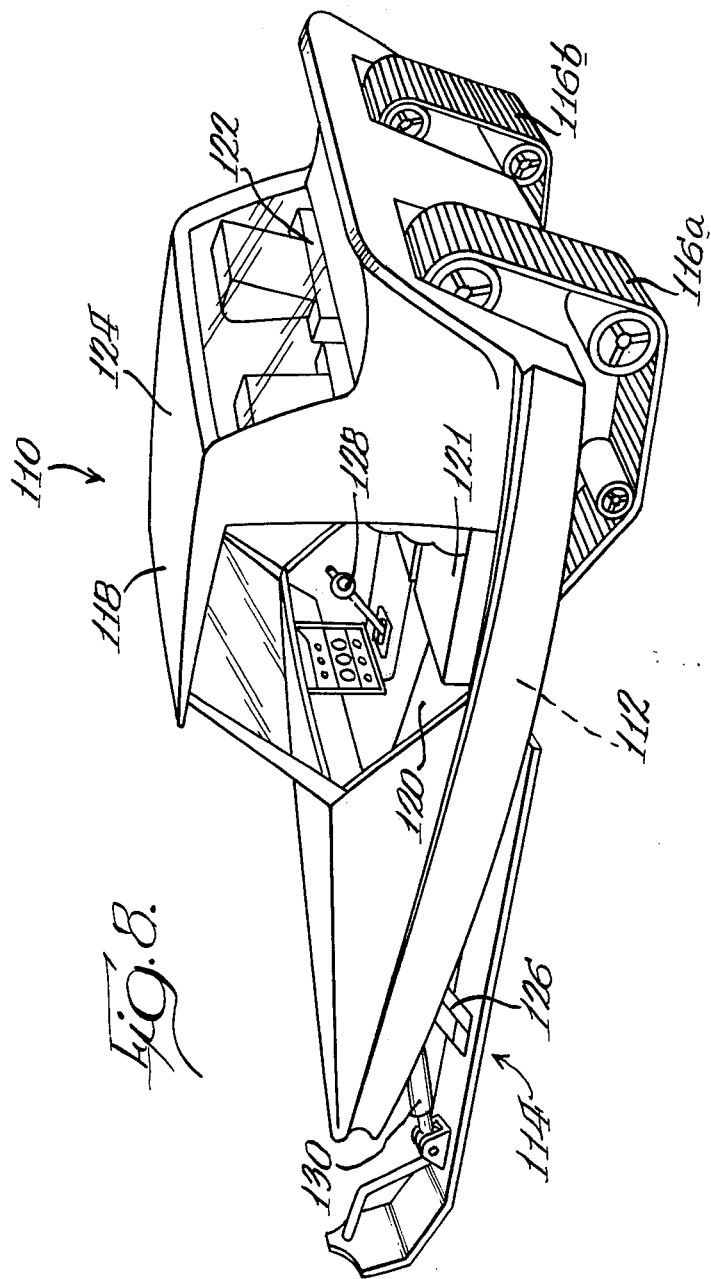

SNOWMOBILE STEERING MECHANISM

BACKGROUND OF THE PRESENT INVENTION

A wide variety of snowmobiles have been provided in the past predominately as recreational vehicles. One primary problem in these prior snowmobile constructions is that as a result of the poor maneuverability of the vehicle, the vehicle requires expert handling by the operator and when not handled by the expert it becomes an extremely dangerous vehicle.

The poor maneuverability is primarily due to the lack of any positive turning function on many types of snow or ice surfaces. In most snow vehicles, the turning function is provided by a pair of space parallel skis that pivot together in a left or right direction to effect left or right turns. Unless the operator exerts a considerable leaning force to the vehicle, the vehicle will continue in a straight line without any significant turning on most snow or ice surfaces, particularly the firmer surfaces.

This deficiency renders the snowmobile vehicle unsuitable for use by the average recreational enthusiast and also even dangerous for those with significant skill in operating this type of vehicle.

SUMMARY OF THE PRESENT INVENTION

In accordance with the present invention a snow vehicle is provided that has increased maneuverability over prior designs produced by a novel steering mechanism. This steering mechanism includes basically a V-shaped ski at the forward end of the vehicle frame having rearwardly extending legs.

An actuating mechanism is provided for raising and lowering the legs to effect turning of the vehicle. This mechanism includes a common control handle that is arranged so that if a left turn is desired it depresses the right ski leg downwardly and raises the left ski leg so that a weight shift occurs much as it would occur of does occur during conventional skiing. For a right hand turn the steering control mechanism operates to lower the left ski leg and raise the right ski leg. It is readily seen that turning of the vehicle is effected without rotation of the ski legs as in prior design and significantly reduces the need for any weight shifting of the operator to make an effective turn.

It should be noted however that the present weight shift steering concept may desirably in some cases be combined with some turning movement of the skis to effect turning.

The rear portions of each leg of the ski are parallel to the direction of travel and flat so that they do not tend to induce turning during straight travel of the vehicle. Only these back surfaces ride on the ground surface during normal straight ahead travel.

Forwardly of these rear planing surfaces are inwardly curved surface portions that are downwardly turned at their inner edges. These surfaces are turned upwardly somewhat so that they do not normally dig into the ground surface upon normal straight ahead travel. However, upon depression of one of these skis, this forward turned-in surface with its downwardly turned inner edge digs into the ground surface and effects a very safe and sure turn of the forward end of the vehicle with the rear end following.

A mechanical control is provided for simultaneously effecting a downward movement of one ski leg and an upward movement of the other ski leg. Toward this end intermeshing gear segments are provided that drive a horizontal bar carrying connecting rods at each end that are fixed at their other ends to the backwardly extending legs of the ski. The horizontal bar may also have some spring action so that it serves as a shock absorbing member.

At the front of the ski where the two legs are joined there is provided a spring which is attached to the frame of the vehicle for the purpose of providing a resilient interconnection at the forward tip of the frame with the ski.

An additional feature of the present invention is that the ski legs increase in width moving forwardly from their rear edges so that as the forward portions of the skis are driven down into the snow upon turning of the vehicle, increased turning torque will be provided.

A still further feature of the invention is in the provision of dual tracks being spaced sufficiently far apart so that the vehicle has increased stability. This increased stability in part contributes to the improved steering of the vehicle since with either of the legs being driven into the snow upon operation of the steering control, there is in effect a three-point suspension with the two tracks at the rear of the vehicle. Too close a spacing of the tracks or a narrow single track would have the disadvantage of permitting the vehicle to rock down on both skis and in effect prevent the steering control mechanism from raising one ski leg from the surface of the snow and driving the other ski leg down into the snow.

BRIEF DESCRIPTION OF THE DRAWINGS

FIG. 1 is a schematic illustration of the snow vehicle according to the present invention;

FIG. 2 is a sub-assembly view of the steering mechanism including the V-shaped ski;

FIG. 3 is a sub-assembly view of the ski;

FIG. 4 is a cross-section of the ski taken generally along line 4—4 of FIG. 2;

FIG. 5 is a front view of the ski sub-assembly;

FIG. 6 is a cross-section of the ski taken generally along line 6—6 of FIG. 4;

FIG. 7 is a cross-section taken generally along line 7—7 of FIG. 4; and

FIG. 8 is a perspective view of a modified form of snow vehicle.

DETAILED DESCRIPTION OF THE PREFERRED EMBODIMENT

Referring to the drawings and in particular FIGS. 1-7, a snow vehicle 10 is illustrated, including a frame 12 carrying and supporting a forward generally V-shaped ski 14, two widely spaced rear track mechanisms 16 and a body 18. It should be understood that only one track mechanism 16 can be seem in FIG. 1, but they are widely spaced apart as the track mechanisms in the embodiment of FIG. 8 to stabilize the rear end of the vehicle 10 and to enhance the steering characteristics of the forward V-shaped ski mechanism 14.

As seen in FIG. 2, the V-shaped ski mechanism 14 is V-shaped or wishbone shaped having a forward upwardly turned apex 20 and rearwardly extending ski legs 22 and 24. The legs 22 and 24 have rear portions 26 and 28 that lie flat on the ground surface as shown in FIG. 6 and also parallel to the axis of the vehicle 10 to provide the straight running forward planing surfaces for the vehicle when no turning of the vehicle is desired. Forwardly of the rear surfaces 26 of the legs 22 and 24, respectively, are wider upturned surfaces 30 and 32 that are inwardly turned toward the center axis of the vehicle and also upwardly turned with respect to the rear planing surfaces 26 and 28 as shown in FIGS. 3, 4 and 5. The surfaces 30 and 32 also have their inner edges turned downwardly as shown clearly in FIGS. 5 and 7.

The primary purpose of the surfaces 30 and 32 is to effect turning of the vehicle by the selective digging into the snow surface by the inner edges 40 as shown in FIGS. 2 and 7.

It should be understood that the ski 14 effects turning movement of the vehicle 10 without any rotation by the ski 14 with respect to the vehicle. However it should be understood that the basic steering concepts of the present invention may also be employed with ski turning mechanisms that do have relative rotation to the vehicle so that one or the other, or both, techniques enhance the turning characteristics of the vehicle.

The ski mechanism 14 is attached to the vehicle frame 12 by a forward shock 42 and rearwardly mounted actuator rods 44 and 46 pivotally connected to the rear ski portions 26 and 28 at pivot points 48 and 50, respectively.

The rods 44 and 46 are supported by fixed bushings 52 and 56, respectively, carried by the frame 12. The upper ends of the rods 44 and 46 are fixed at 58 and 60 to a spring steel crossbar 62 which is carried by the frame 12 but is permitted some flexure with respect thereto so that it acts as a partial shock absorber for the ski 14 through the rods 44 and 46.

Shock absorbers 64 and 66 are connected to pivots 48 and 50, respectively, and attached at their opposite ends 69 and 70 to the frame 12 for the purpose of cushioning the ski at the rear ends of the ski legs.

The ski 14 effects turning movement of the vehicle 12 by the selective raising and lowering of the legs 22 and 24. That is, when leg 22 is lowered, leg 24 is raised, and conversely when leg 24 is lowered leg 22 is raised.

Toward this end a single control handle 72 is provided within the interior of the coupe body 18 and drives a gear 74 supported by frame 12 and also a gear 76 also supported by the frame 12 and connected to the crossbar 62.

The leftward movement of the control handle 72 rotates gears 74 and 76 in a direction to lower the actuator rod 44 and raise the actuator rod 46. This effects lowering of ski leg 22 and raising of the ski leg 24. By lowering the ski leg 22, the portion 30 of that leg will be driven down into the snow or ice surface in turn driving the inner edge 40 as shown in FIG. 7 into the ground surface from its normally upwardly turned position. Since the portion 30 of the leg 22 is inwardly turned with respect to the axis of vehicle 10, it will drive the vehicle to the left much like driving the left edge of the right ski in normal skiing into the snow will effect the left turning movement of the body of a skier. At the same time the left ski 24 is raised so that surface 32 in no way interferes with the left turning movement of the vehicle.

A right turning movement of the vehicle is effected by rotating the control handle 72 to the right (with respect to the interior of the cockpit of body 18). This shifts rod 46 down and rod 44 upwardly driving ski leg 24 downwardly and its downwardly and inwardly turned surface 32 down into the snow or ice surface turning the vehicle in a rightwardly direction without any rotation of the ski mechanism 14 with respect to the frame 12 of the vehicle 10.

In the embodiment of FIG. 8 a somewhat modified form of the present invention is illustrated. This is seen to include a snow vehicle 110 having a frame 112, a forward ski mechanism 114 and spaced rear track assemblies 116A and 116B. The tracks 116A and 116B have their inner edges spaced at least 16 inches apart for stability of the vehicle, and the body 118 has a cockpit 120 accommodating two seats 121 and 122 in side by side fashion, with the body having a top 124 for protection from the elements as well as increased safety of the vehicle.

The forward ski 114 pivots with respect to the frame 112 through the inter-position of a rotary steering member 126 controlled by steering control 128 within the cockpit 120. A forward shock 130 assists in supporting the ski 114 as well as providing a cushion mounting for the ski. The ski mechanism 114 differs from the ski mechanism 14 in the FIGS. 1-7 embodiment in that it does not move upwardly and downwardly to effect steering movement, but rather rotates with respect to the frame 112 about a generally vertical axis.

We claim:

1. In a snow vehicle having a frame means, a propelling means, a steering mechanism including ski means, improvement comprising: said ski means including a first and second skis, said skis being attached to each other rearwardly and forwardly, and means for raising or lowering said skis to effect turning of the vehicle.

2. In a snow vehicle having a frame means, a propelling means carried by said frame means, a steering means including two skis, the improvement comprising: two skis having adjoining tips with the inner edges thereof turned downwardly, and means for selectively lowering each of said skis to effect right or left turning movement of the vehicle.

3. In a snow vehicle having a frame means, a propelling means for the vehicle including two spaced and endless tracks suspended from said frame means at the rear of the frame means, a steering mechanism including spaced first and second skis at the forward end of the vehicle, improvement comprising: tracks being widely spaced from each other for stability of said vehicle, a first and second skis connected to one another rearwardly and forwardly, means for moving said first ski up and said second ski down to effect turning of the vehicle in one direction, and means for moving said first ski down and said second ski up to effect turning of the vehicle in the other direction.

4. In a snow vehicle having a frame means, a propelling means carried by said frame means, a steering means including two skis, the improvement comprising: means for selectively lowering each of said skis, said inner edges of each ski are turned downwardly as the ski moves downwardly under the influence of the steering mechanism.

5. A snow vehicle as defined in claim 4, wherein each ski has a rear portion parallel to the direction of travel and a forward portion turned inwardly of the direction of travel so that the tips of each ski are joined to effect turning of said vehicle by the cooperation of said skis in unison.

6. A snow vehicle as defined in claim 5, wherein said forward portion has the inner edges thereof turned downwardly and the rear portion is substantially flat.

7. A snow vehicle as defined in claim 4, wherein said steering mechanisms include actuator means at rear portion of each ski for raising and lowering each ski.

8. A snow vehicle as defined in claim 4, wherein said first and second skis are joined together at the forward portions thereof.

9. A snow vehicle, comprising frame means, propelling means, a generally V-shaped ski at the front of said frame mechanism, said V-shaped ski having first and second legs, each of said legs having a rear portion generally parallel with the frame means and a second portion turned inwardly toward the centerline of the frame means, said second portion being turned upwardly relative to said first portion.

10. A snow vehicle as defined in claim 9, including steering means for the vehicle having means for raising the first leg up and simultaneously lowering the second leg down, and for lowering the first leg down and simultaneously raising the second leg up.

11. A snow vehicle as defined in claim 10, wherein said steering means includes actuators connected to the first portion of each ski leg.

12. A snow vehicle as defined in claim 11, wherein said steering means includes a common control member for controlling movement of both of said ski legs.

13. A snow vehicle as defined in claim 12, wherein said steering means includes gearing for moving said ski legs simultaneously.

14. A snow vehicle, comprising frame means, first endless track means at the rear of said frame means, second endless track means at the rear of said frame means spaced a substantial distance laterally from said first track means, a generally V-shaped ski at the forward end of said frame means having first and second rearwardly extending legs, each of said legs having a flat rear portion and an upwardly and inwardly extending forward portion, means connecting said forward portion to to said frame mechanism, a steering mechanism including means for exerting a downward pressure slectively to each of said ski legs, and common control means for actuating both of said legs.

* * * * *